US009946666B2

(12) United States Patent
Heinrich et al.

(10) Patent No.: US 9,946,666 B2
(45) Date of Patent: Apr. 17, 2018

(54) COALESCING TEXTURE ACCESS AND LOAD/STORE OPERATIONS

(71) Applicant: NVIDIA Corporation, Santa Clara, CA (US)

(72) Inventors: Steven James Heinrich, Madison, AL (US); Ramesh Jandhyala, Austin, TX (US); Bengt-Olaf Schneider, Yorktown Heights, NY (US)

(73) Assignee: NVIDIA Corporation, Santa Clara, CA (US)

( * ) Notice: Subject to any disclaimer, the term of this patent is extended or adjusted under 35 U.S.C. 154(b) by 110 days.

(21) Appl. No.: 13/960,719

(22) Filed: Aug. 6, 2013

(65) Prior Publication Data

US 2015/0046662 A1 Feb. 12, 2015

(51) Int. Cl.
*G06F 12/00* (2006.01)
*G06F 13/16* (2006.01)

(52) U.S. Cl.
CPC .......... *G06F 13/1621* (2013.01); *G06F 12/00* (2013.01); *G06F 13/1626* (2013.01); *Y02B 60/1228* (2013.01)

(58) Field of Classification Search
CPC .................................................. G06F 12/00
USPC ........................................................ 711/151
See application file for complete search history.

(56) References Cited

U.S. PATENT DOCUMENTS

| 5,790,130 | A | * | 8/1998 | Gannett | G06F 12/0846 |
| | | | | | 345/587 |
| 6,075,544 | A | * | 6/2000 | Malachowsky | G09G 5/393 |
| | | | | | 345/422 |
| 7,492,368 | B1 | * | 2/2009 | Nordquist | G06F 13/161 |
| | | | | | 345/502 |
| 7,805,575 | B1 | * | 9/2010 | Agarwal | G06F 12/0811 |
| | | | | | 711/141 |
| 7,999,817 | B1 | * | 8/2011 | Tao | G06T 1/00 |
| | | | | | 345/530 |
| 2010/0164983 | A1 | * | 7/2010 | Lawrence | G06T 11/40 |
| | | | | | 345/611 |
| 2010/0306448 | A1 | * | 12/2010 | Chen | G06F 12/0804 |
| | | | | | 711/103 |
| 2011/0078692 | A1 | * | 3/2011 | Nickolls | G06F 9/3004 |
| | | | | | 718/103 |
| 2011/0082961 | A1 | * | 4/2011 | Minkin et al. | 710/309 |
| 2012/0198214 | A1 | * | 8/2012 | Gadre et al. | 712/225 |
| 2013/0042090 | A1 | * | 2/2013 | Krashinsky | G06F 9/3016 |
| | | | | | 712/214 |

\* cited by examiner

*Primary Examiner* — Daniel C Chappell
*Assistant Examiner* — Gautam Sain
(74) *Attorney, Agent, or Firm* — Zilka-Kotab, PC

(57) ABSTRACT

A system, method, and computer program product are provided for coalescing memory access requests. A plurality of memory access requests is received in a thread execution order and a portion of the memory access requests are coalesced into memory order, where memory access requests included in the portion are generated by threads in a thread block. A memory operation is generated that is transmitted to a memory system, where the memory operation represents the coalesced portion of memory access requests.

17 Claims, 8 Drawing Sheets

COALESCING TEXTURE ACCESS AND LOAD/STORE OPERATIONS

FIELD OF THE INVENTION

The present invention relates to memory accesses, and more particularly to coalescing memory accesses.

BACKGROUND

Conventional graphics processors include dedicated texture map processing circuitry that is configured to read texture data from texture maps stored in memory. Separate circuitry is configured to perform load and store operations to access the memory for performing other graphics processing such as z-buffering and blending. Providing separate circuitry for accessing memory requires more circuitry than is needed to support either texture reads or load and store operations.

Thus, there is an opportunity to reduce the circuitry used to access memory and/or address other issues associated with the prior art.

SUMMARY

A system, method, and computer program product are provided for coalescing memory access requests. A plurality of memory access requests is received in a thread execution order and a portion of the memory access requests are coalesced into memory order, where memory access requests included in the portion are generated by threads in a single thread block. A memory operation is generated that is transmitted to a memory system, where the memory operation represents the coalesced portion of memory access requests.

DETAILED DESCRIPTION

The invention efficiently implements a unified approach for coalescing texture operations performed with texture processing circuitry of a graphics processing unit with surface operations, load/store memory accesses and other memory operations performed by graphics and parallel computing systems. Texture processing circuitry is traditionally a high-throughput read-only path from memory to a processor and represents a significant development of specialized behaviors that help maximize overall architectural efficiency. The texture processing circuitry is extended to support load/store memory accesses including load/store accesses of surfaces stored in memory. Coalescing of memory access requests before the requests reach the memory system enables a more efficient sequence of memory operations to be transferred over an interconnection network connecting the texture processing circuitry to the memory system.

Figure 1:
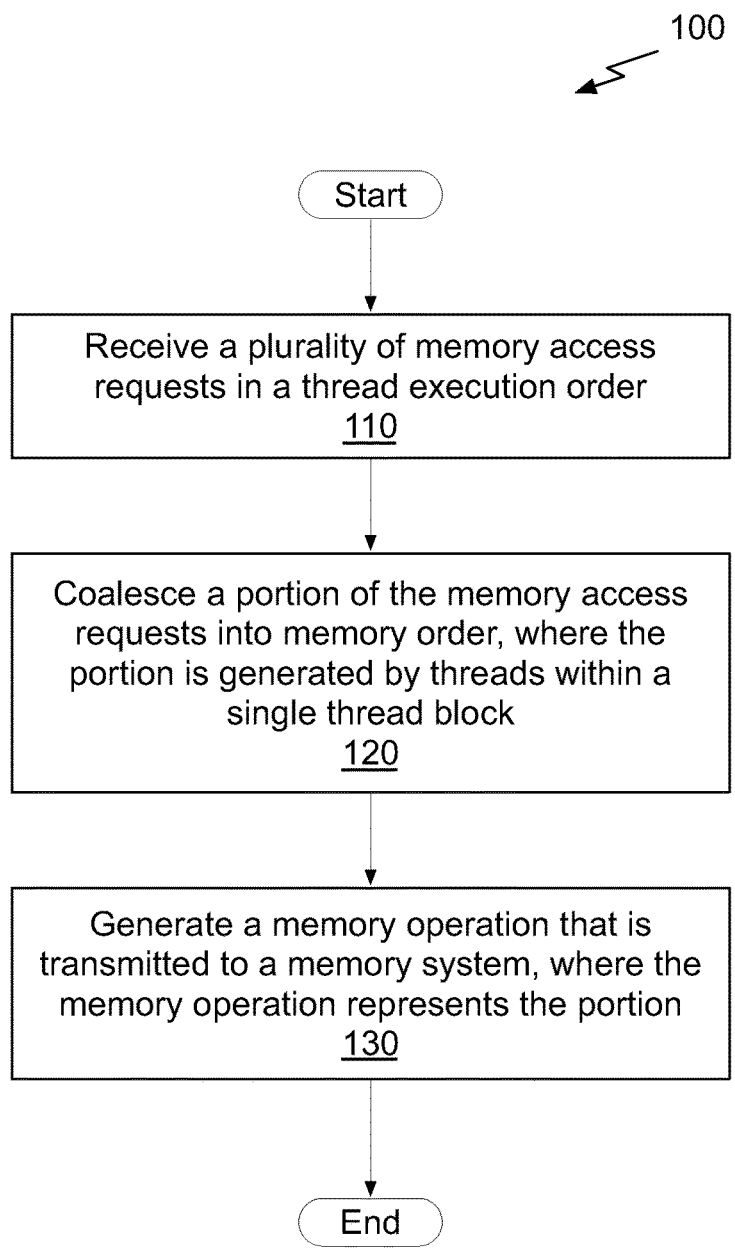
FIG. 1 illustrates a flowchart of a method for coalescing memory access requests, in accordance with one embodiment.

FIG. 1A illustrates a flowchart of a method 100 for coalescing memory access requests, in accordance with one embodiment. In the context of the following description, a memory access request may be a load (read) request that requests data to be read from the memory or a store (write) request that requests data to be written to the memory. In one embodiment, the method 100 may be extended to operations other than load and store requests, such as prefetch requests, reduction operations, and atomic operations. At operation 110, a plurality of memory access requests is received in a thread execution order. In the context of the following description, thread execution order is an order that the requests are generated by a thread or by threads in a thread block. In one embodiment, the plurality of memory access requests may include access requests generated by a multi-threaded processing pipeline and may also include one or more texture access requests to load texture data.

At operation 120, a portion of the memory access requests is coalesced into memory order, where memory access requests included in the portion are generated by threads in a single thread block. Memory order is a sequence of memory operations that are performed on linear addresses for physical memory locations or for virtual memory locations. In the context of the following description, threads in the same thread block may be executed in parallel to efficiently process a set of data according to a sequence of program instructions. At operation 130, a memory operation is generated that is transmitted to a memory system, where the memory operation represents the coalesced portion of memory access requests. The memory system may include one or more of a level-one (L1) cache, a level-two (L2) cache, a local memory, and system memory.

More illustrative information will now be set forth regarding various optional architectures and features with which the foregoing framework may or may not be implemented, per the desires of the user. It should be strongly noted that the following information is set forth for illustrative purposes and should not be construed as limiting in any manner. Any of the following features may be optionally incorporated with or without the exclusion of other features described.

A sequence of program instructions may be executed by a group of parallel threads, where the group may include T threads. In one embodiment T=32 and the sequence of program instructions may represent a shader program for processing graphics data. Parallel execution of the threads is intended to benefit from locality of the data being processed, so that performance is improved. Therefore, graphics and compute programming models attempt to exploit the thread block organization to achieve locality and high performance.

In a graphics processor, texture processing circuitry may be configured to operate on a subset of a thread block such as four threads that are each assigned to a pixel of a 2×2 pixel quad. Using a 2×2 pixel quad enables calculation of a level-of-detail using the rate of change of the texture coordinates with respect to the display space. During graphics processing, one or more pixel quads may be packed within a thread block, and a texture read access may be generated for each pixel quad or when multiple pixel quads are localized a texture read access may provide data for multiple pixel quads. In contrast with the texture accesses, other load and store operations are not generally performed at the pixel quad granularity. Instead the other load and store operations are performed at a thread block granularity.

In addition to benefitting from locality of threads within a pixel quad or a thread block, locality may also exist between different thread blocks. The thread blocks may be organized into a work unit of a graphics subtile or a compute cooperative thread array (CTA). Again, programming models are designed and processors are architected to exploit the locality of the thread blocks and work units that include multiple thread blocks for improved memory access and processing performance. Coalescing memory accesses may improve access efficiency as well as reduce power because several separate accesses to the same cache line may be combined into a single access.

Conventional graphics processors provide separate memory access paths, a first path for read-only texture accesses and a second path for other load and store accesses. As described further herein, the separate memory access paths may be combined into a single memory access path and the memory access requests may be coalesced so that accesses to the same cache line (or other unit of memory) are combined into a single memory operation. The store requests are configured to write data to a memory system, where data may include commands and/or instructions. Similarly, the load requests are configured to read data from the memory system, where the data may include texture data, commands, and/or other data or instructions. Texture reads and load and store operations that access a surface (e.g., dimensioned memory allocation, such as a frame buffer) are typically specified by texture coordinates or pixel coordinates, whereas other load and store accesses specify virtual addresses. Therefore, the single access path is configured to handle virtual addresses as well as coordinates when coalescing the memory access requests.

Figure 2:
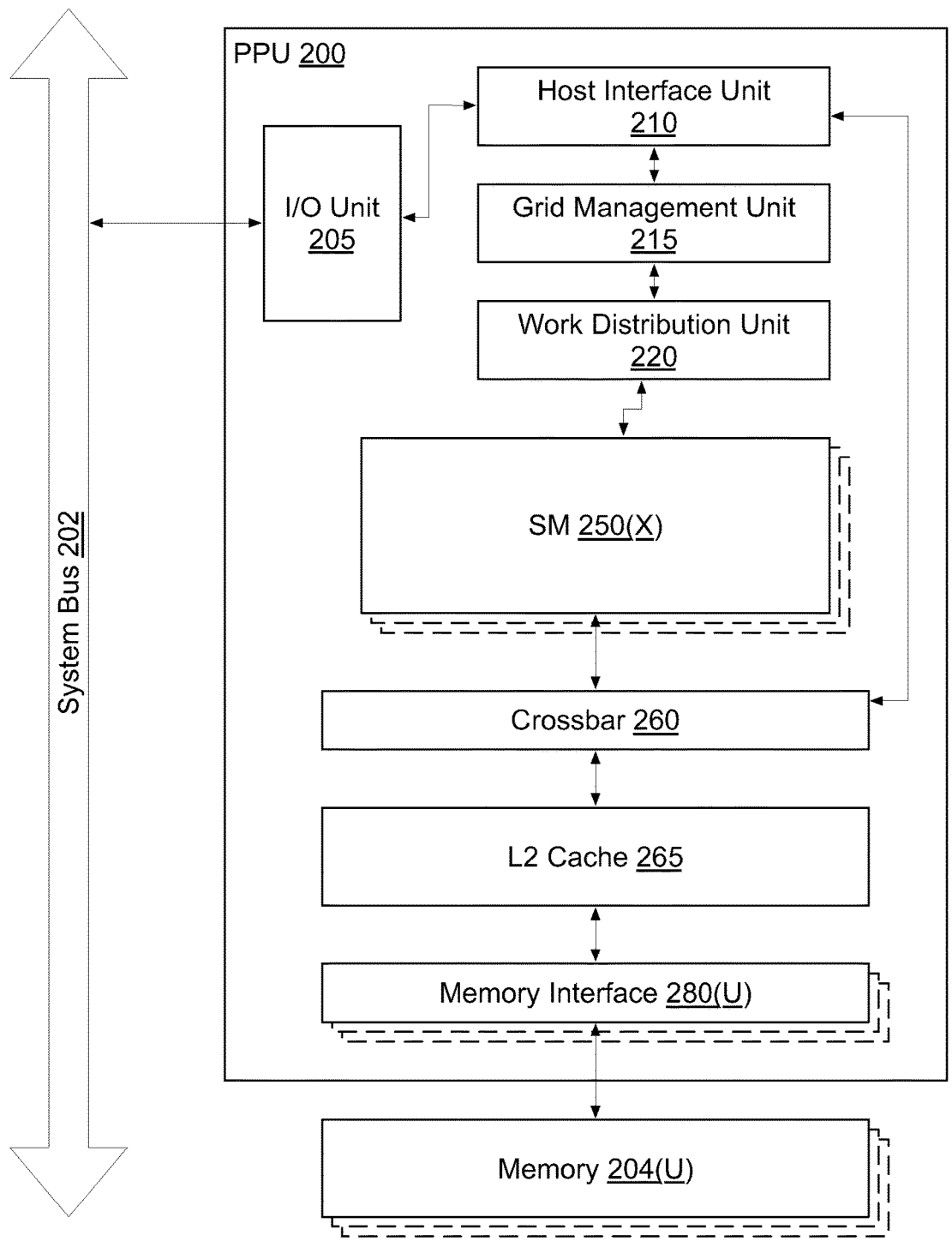
FIG. 2 illustrates a parallel processing unit (PPU), according to one embodiment.

FIG. 2 illustrates a parallel processing unit (PPU) 200, according to one embodiment. While a parallel processor is provided herein as an example of the PPU 200, it should be strongly noted that such processor is set forth for illustrative purposes only, and any processor may be employed to supplement and/or substitute for the same. In one embodiment, the PPU 200 comprises X streaming multi-processors (SMs) 250 and is configured to execute a plurality of threads concurrently in two or of the SMs 250(X). A thread (i.e., a thread of execution) is an instantiation of a set of instructions executing within a particular SM 250. Each SM 250, described below in more detail in conjunction with FIG. 3, may include, but is not limited to, one or more processing cores, one or more load/store units (LSUs), a level-one (L1) cache, shared memory, and the like.

In one embodiment, the PPU 200 includes an input/output (I/O) unit 205 configured to transmit and receive communications (i.e., commands, data, etc.) from a central processing unit (CPU) (not shown) over the system bus 202. The I/O unit 205 may implement a Peripheral Component Interconnect Express (PCIe) interface for communications over a PCIe bus. In alternative embodiments, the I/O unit 205 may implement other types of well-known bus interfaces.

The PPU 200 also includes a host interface unit 210 that decodes the commands and transmits the commands to the task management unit 215 or other units of the PPU 200 (e.g., memory interface 280) as the commands may specify. In one embodiment, the PPU 200 comprises U memory interfaces 280(U), where each memory interface 280(U) is connected to a corresponding memory device 204(U). The host interface unit 210 is configured to route communications between and among the various logical units of the PPU 200.

In one embodiment, a program encoded as a command stream is written to a buffer by the CPU. The buffer is a region in memory, e.g., memory 204 or system memory, that is accessible (i.e., read/write) by both the CPU and the PPU 200. The CPU writes the command stream to the buffer and then transmits a pointer to the start of the command stream to the PPU 200. The host interface unit 210 provides the grid management unit (GMU) 215 with pointers to one or more streams. The GMU 215 selects one or more streams and is configured to organize the selected streams as a pool of pending grids. In one embodiment, a thread block comprises 32 related threads and a grid is an array of one or more thread blocks that execute the same stream and the different thread blocks may exchange data through global memory. The pool of pending grids may include new grids that have not yet been selected for execution and grids that have been partially executed and have been suspended.

A work distribution unit 220 that is coupled between the GMU 215 and the SMs 250 manages a pool of active grids, selecting and dispatching active grids for execution by the SMs 250. Pending grids are transferred to the active grid pool by the GMU 215 when a pending grid is eligible to execute, i.e., has no unresolved data dependencies. An active grid is transferred to the pending pool when execution of the active grid is blocked by a dependency. When execution of a grid is completed, the grid is removed from the active grid pool by the work distribution unit 220. In addition to receiving grids from the host interface unit 210 and the work distribution unit 220, the GMU 215 also receives grids that are dynamically generated by the SMs 250 during execution of a grid. These dynamically generated grids join the other pending grids in the pending grid pool.

In one embodiment, the CPU executes a driver kernel that implements an application programming interface (API) that enables one or more applications executing on the CPU to schedule operations for execution on the PPU 200. An application may include instructions (i.e., API calls) that cause the driver kernel to generate one or more grids for execution. In one embodiment, the PPU 200 implements a SIMT (Single-Instruction, Multiple-Thread) architecture where each thread block (i.e., warp) in a grid is concurrently executed on a different data set by different threads in the thread block. The driver kernel defines thread blocks that are comprised of k related threads, such that threads in the same thread block may exchange data through shared memory.

In one embodiment, the PPU 200 may include 15 distinct SMs 250. Each SM 250 is multi-threaded and configured to execute a plurality of threads (e.g., 32 threads) from a particular thread block concurrently. Each of the SMs 250 is connected to a level-two (L2) cache 265 via a crossbar 260 (or other type of interconnect network). The L2 cache 265 is connected to one or more memory interfaces 280. Memory interfaces 280 implement 16, 32, 64, 128-bit data buses, or the like, for high-speed data transfer. In one embodiment, the PPU 200 may be connected to up to 6 memory devices 204, such as graphics double-data-rate, version 5, synchronous dynamic random access memory (GDDR5 SDRAM).

In one embodiment, the PPU 200 implements a multi-level memory hierarchy. The memory 204 is located off-chip in SDRAM coupled to the PPU 200. Data from the memory 204 may be fetched and stored in the L2 cache 265, which is located on-chip and is shared between the various SMs 250. In one embodiment, each of the SMs 250 also implements an L1 cache. The L1 cache is private memory that is dedicated to a particular SM 250. Each of the L1 caches is coupled to the shared L2 cache 265. Data from the L2 cache 265 may be fetched and stored in each of the L1 caches for processing in the functional units of the SMs 250.

In one embodiment, the PPU 200 comprises a graphics processing unit (GPU). The PPU 200 is configured to receive commands that specify shader programs for processing graphics data. Graphics data may be defined as a set of primitives such as points, lines, triangles, quads, triangle strips, and the like. Typically, a primitive includes data that specifies a number of vertices for the primitive (e.g., in a model-space coordinate system) as well as attributes associated with each vertex of the primitive. The PPU 200 can be configured to process the graphics primitives to generate a frame buffer (i.e., pixel data for each of the pixels of the display). The driver kernel implements a graphics processing pipeline, such as the graphics processing pipeline defined by the OpenGL API.

An application writes model data for a scene (i.e., a collection of vertices and attributes) to memory. The model data defines each of the objects that may be visible on a display. The application then makes an API call to the driver kernel that requests the model data to be rendered and displayed. The driver kernel reads the model data and writes commands to the buffer to perform one or more operations to process the model data. The commands may encode different shader programs including one or more of a vertex shader, hull shader, geometry shader, pixel shader, etc. For example, the GMU 215 may configure one or more SMs 250 to execute a vertex shader program that processes a number of vertices defined by the model data. In one embodiment, the GMU 215 may configure different SMs 250 to execute different shader programs concurrently. For example, a first subset of SMs 250 may be configured to execute a vertex shader program while a second subset of SMs 250 may be configured to execute a pixel shader program. The first subset of SMs 250 processes vertex data to produce processed vertex data and writes the processed vertex data to the L2 cache 265 and/or the memory 204. After the processed vertex data is rasterized (i.e., transformed from three-dimensional data into two-dimensional data in screen space) to produce fragment data, the second subset of SMs 250 executes a pixel shader to produce processed fragment data, which is then blended with other processed fragment data and written to the frame buffer in memory 204. The vertex shader program and pixel shader program may execute concurrently, processing different data from the same scene in a pipelined fashion until all of the model data for the scene has been rendered to the frame buffer. Then, the contents of the frame buffer are transmitted to a display controller for display on a display device.

The PPU 200 may be included in a desktop computer, a laptop computer, a tablet computer, a smart-phone (e.g., a wireless, hand-held device), personal digital assistant (PDA), a digital camera, a hand-held electronic device, and the like. In one embodiment, the PPU 200 is embodied on a single semiconductor substrate. In another embodiment, the PPU 200 is included in a system-on-a-chip (SoC) along with one or more other logic units such as a reduced instruction set computer (RISC) CPU, a memory management unit (MMU), a digital-to-analog converter (DAC), and the like.

In one embodiment, the PPU 200 may be included on a graphics card that includes one or more memory devices 204 such as GDDR5 SDRAM. The graphics card may be configured to interface with a PCIe slot on a motherboard of a desktop computer that includes, e.g., a northbridge chipset and a southbridge chipset. In yet another embodiment, the PPU 200 may be an integrated graphics processing unit (iGPU) included in the chipset (i.e., Northbridge) of the motherboard.

Figure 3:
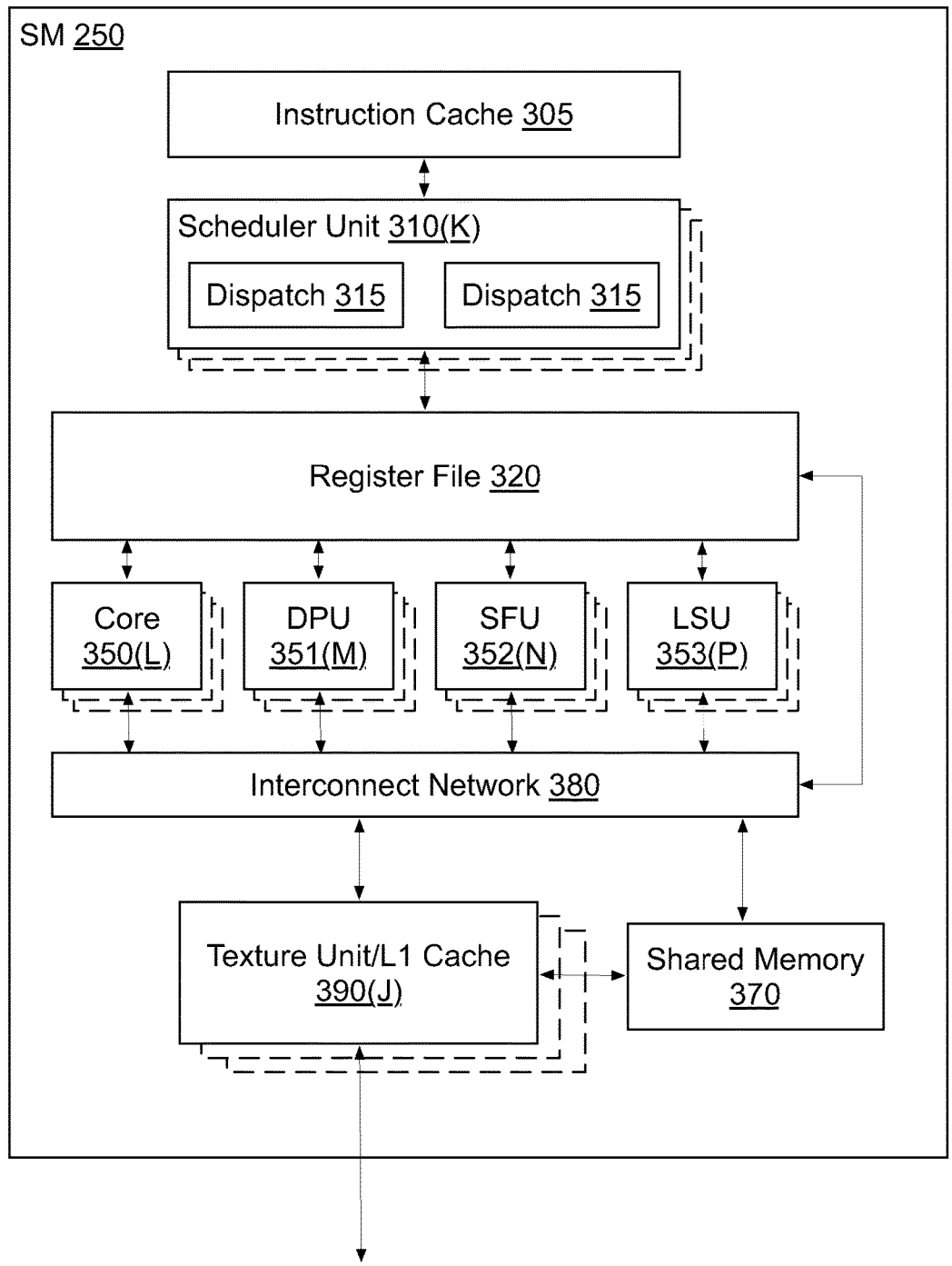
FIG. 3 illustrates the streaming multi-processor of FIG. 2, according to one embodiment.

FIG. 3 illustrates the streaming multi-processor 250 of FIG. 2, according to one embodiment. As shown in FIG. 3, the SM 250 includes an instruction cache 305, one or more scheduler units 310, a register file 320, one or more processing cores 350, one or more double precision units (DPUs) 351, one or more special function units (SFUs) 352, one or more load/store units (LSUs) 353, an interconnect network 380, a shared memory 370, and one or more texture unit/L1 caches 390.

As described above, the work distribution unit 220 dispatches active grids for execution on one or more SMs 250 of the PPU 200. The scheduler unit 310 receives the grids from the work distribution unit 220 and manages instruction scheduling for one or more thread blocks of each active grid. The scheduler unit 310 schedules threads for execution in groups of parallel threads, where each group is called a warp. In one embodiment, each warp includes 32 threads. The scheduler unit 310 may manage a plurality of different thread blocks, allocating the thread blocks to warps for execution and then scheduling instructions from the plurality of different warps on the various functional units (i.e., cores 350, DPUs 351, SFUs 352, and LSUs 353) during each clock cycle.

In one embodiment, each scheduler unit 310 includes one or more instruction dispatch units 315. Each dispatch unit 315 is configured to transmit instructions to one or more of the functional units. In the embodiment shown in FIG. 3, the scheduler unit 310 includes two dispatch units 315 that enable two different instructions from the same warp to be dispatched during each clock cycle. In alternative embodiments, each scheduler unit 310 may include a single dispatch unit 315 or additional dispatch units 315.

Each SM 350 includes a register file 320 that provides a set of registers for the functional units of the SM 350. In one embodiment, the register file 320 is divided between each of the functional units such that each functional unit is allocated a dedicated portion of the register file 320. In another embodiment, the register file 320 is divided between the different warps being executed by the SM 250. The register file 320 provides temporary storage for operands connected to the data paths of the functional units.

Each SM 250 comprises L processing cores 350. In one embodiment, the SM 250 includes a large number (e.g., 192, etc.) of distinct processing cores 350. Each core 350 is a fully-pipelined, single-precision processing unit that includes a floating point arithmetic logic unit and an integer arithmetic logic unit. In one embodiment, the floating point arithmetic logic units implement the IEEE 754-2008 standard for floating point arithmetic. Each SM 250 also comprises M DPUs 351 that implement double-precision floating point arithmetic, N SFUs 352 that perform special functions (e.g., copy rectangle, pixel blending operations, and the like), and P LSUs 353 that implement load and store operations between the shared memory 370 and the register file 320 via the J texture unit/L1 caches 390 and the interconnect network 380. The J texture unit/L1 caches 390 are coupled between the interconnect network 380 and the shared memory 370 and are also coupled to the crossbar 260. In one embodiment, the SM 250 includes 64 DPUs 351, 32 SFUs 352, and 32 LSUs 353. In another embodiment, the L1 cache is not included within the texture unit and is instead included with the shared memory 370 with a separate direct connection to the crossbar 260.

Each SM 250 includes an interconnect network 380 that connects each of the functional units to the register file 320 and to the shared memory 370 through the interconnect network 380. In one embodiment, the interconnect network 380 is a crossbar that can be configured to connect any of the functional units to any of the registers in the register file 320, to any of the J texture unit/L1 caches 390, or the memory locations in shared memory 370.

In one embodiment, the SM 250 is implemented within a GPU. In such an embodiment, the SM 250 comprises J texture unit/L1 caches 390. The texture unit/L caches 390 are configured to access texture maps (i.e., a 2D array of texels) from the memory 204 and sample the texture maps to produce sampled texture values for use in shader programs. The texture unit/L1 caches 390 implement texture operations such as anti-aliasing operations using mip-maps (i.e., texture maps of varying levels of detail). In one embodiment, the SM 250 includes 16 texture unit/L1 caches 390. As described further herein, the texture unit/L1 caches 390 are also configured to receive load and store requests from the LSUs 353 and to coalesce the texture accesses and the load and store requests to generate coalesced memory operations that are output to a memory system that includes the shared memory 370. The memory system may also include the L2 cache 265, memory 204, and a system memory (not shown).

The PPU 200 described above may be configured to perform highly parallel computations much faster than conventional CPUs. Parallel computing has advantages in graphics processing, data compression, biometrics, stream processing algorithms, and the like.

Figure 4A:
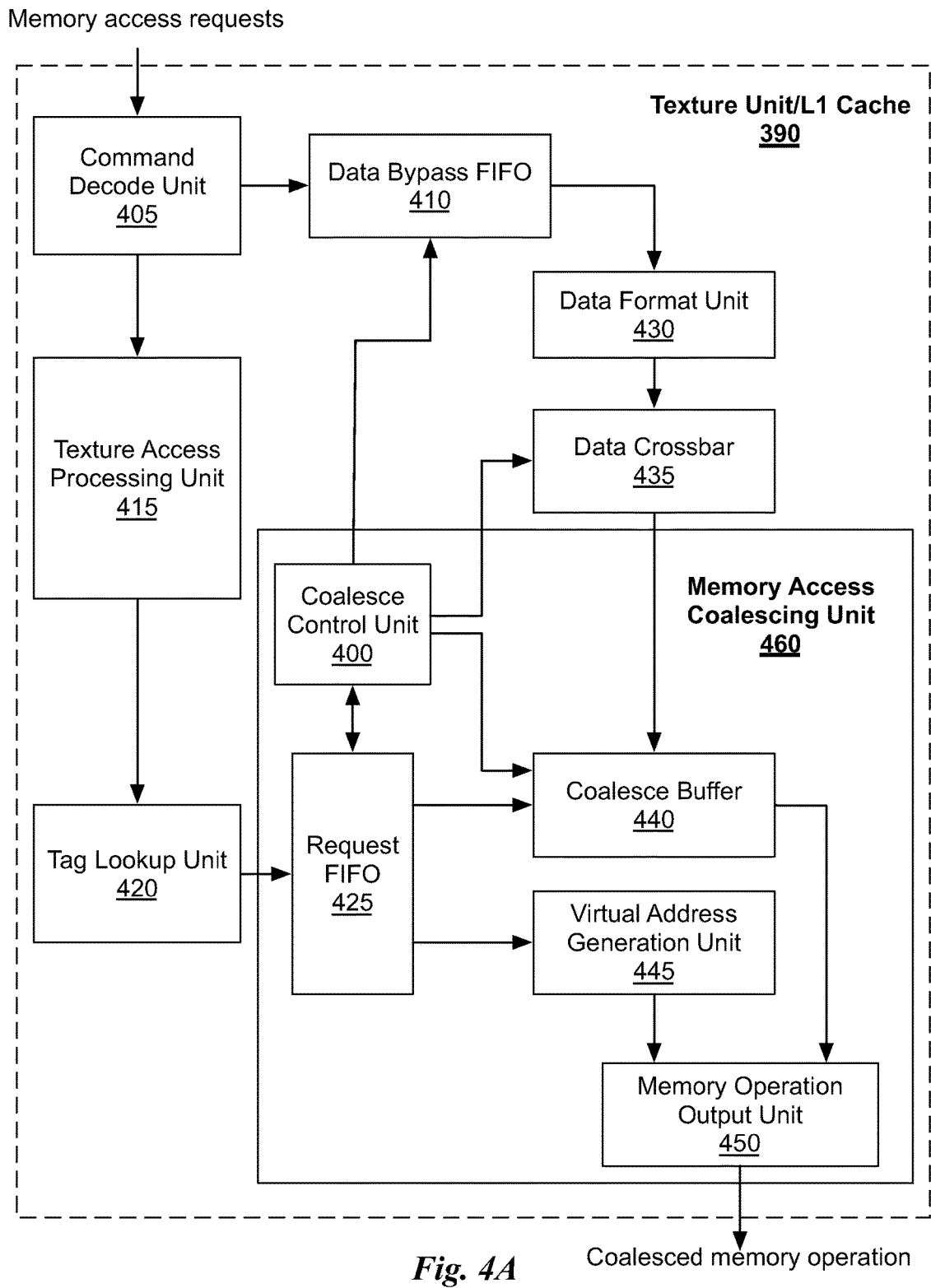
FIG. 4A illustrates a diagram of the texture unit of FIG. 3 that includes a memory access coalescing unit, according to one embodiment.

FIG. 4A illustrates a diagram of a portion of the texture unit/L1 cache 390 of FIG. 3 that includes a memory access coalescing unit 460, according to one embodiment. The texture unit/L1 cache 390 includes a command decode unit 405, data bypass FIFO 410, data format unit 430, data crossbar 435, texture access processing unit 415, tag lookup unit 420, and a memory access coalescing unit 460. Memory access requests are received by the command decode unit 405 and each memory access request includes an address represented as coordinates or a virtual address, byte enables indicating the bytes to be loaded or stored, and state information indicating whether the memory request is an end-of-warp (i.e., a request generated when a last executing thread of a warp executes a particular instruction). The memory access requests are received in thread execution order. The command decode unit 405 decodes the requests and outputs texture access requests to the texture access processing unit 415. The load and store requests (without the data for store requests) may be passed through the texture access processing unit 415 or a bypass path (not shown) may be provided for the load and store requests. The command decode unit 405 outputs data associated with the store requests to the data bypass FIFO 410.

The texture access processing unit 415 may be configured to calculate texture level-of-detail values, assemble the texture lookup values according to the pixel footprint in texture space, calculate filter blend weights, and other texture mapping specific operations. The texture access processing unit 415 outputs the memory access requests (without the data for store requests) to the tag lookup unit 420.

The texture access requests are expressed as a function of coordinates (e.g., x, y, z, index, level-of-detail, and texture map identifier). Load and store requests that access surfaces may also be expressed as coordinates. Other load and store requests are typically expressed in terms of a linear address space and may be represented using virtual addresses. In particular, local addresses are defined for a given thread of a warp for a shader program. The thread-relative (or warp-relative) local addresses may be converted into physical or virtual addresses prior to or by the tag lookup unit 420. The tag lookup unit 420 may be configured to process addresses represented as coordinates, physical addresses, or virtual addresses to generate cache tags for requests and performs cache miss processing. The tag lookup unit 420 outputs the memory access requests to the request FIFO 425 in the memory access coalescing unit 460 where the memory access requests are stored in thread execution order. Coalesced memory operations are output to the L2 cache 265 and memory interface 280 via the crossbar 260.

The data corresponding to store requests arrives at the memory access coalescing unit 460 via the data bypass FIFO 410, data format unit 430, and the data crossbar 435. In one embodiment, the data format unit 430 is configured to replicate data subwords (e.g., 8 bit or 16 bit data) to generate 32 bit format data. The data format unit 430 outputs the formatted data to the data crossbar 435 in thread execution order. The data crossbar 435 may be configured to operate on data organized into 32-bit channels. In one embodiment, the data crossbar 435 supports 8 source channels and 32 destination channels and transforms the formatted data received in thread execution order to memory order. The data crossbar 435 is configured by the coalesce control unit 400 to route data from the data format unit 430 into a coalesce buffer 440 within the memory access coalescing unit 460.

Figure 4B:
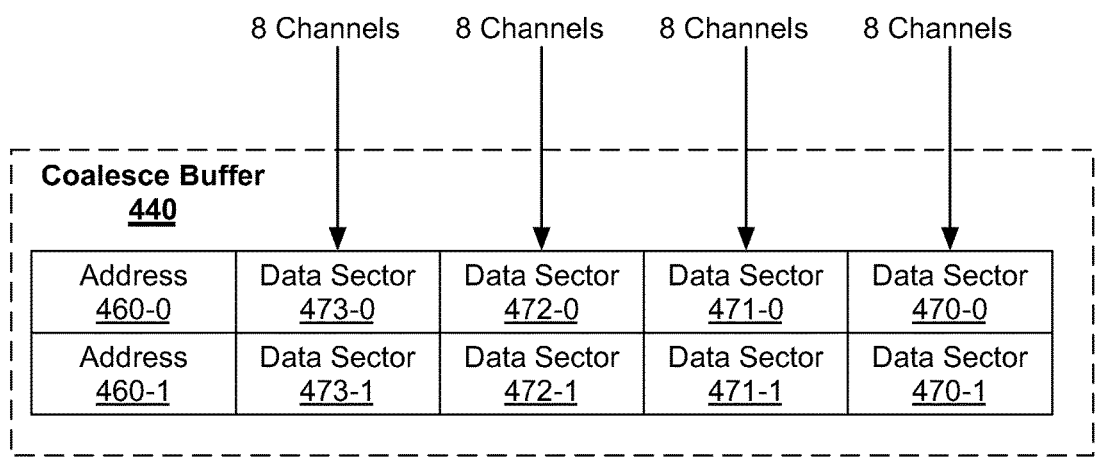
FIG. 4B illustrates a diagram of the coalesce buffer of FIG. 4A, according to one embodiment.

FIG. 4B illustrates a diagram of the coalesce buffer 440 of FIG. 4A, according to one embodiment. In one embodiment, the coalesce buffer 440 includes two entries, each entry having a capacity of 128 bytes of data. The capacity of the entries may match the width of a cache line and/or a destination memory word. In other embodiments, the coalesce buffer 440 may include only a single entry or more than two entries and the entries may have a capacity that is larger or smaller than 128 bytes. The purpose of coalescing is to reconstitute localized memory accesses within the thread execution ordered stream of requests that are generated during the execution of a warp into a memory ordered stream of operations for execution by the memory system. Load requests (including texture read requests) are coalesced separately from store requests. However, because the texture read requests access texture maps, the texture read requests are unlikely to coalesce with one or more load requests that do not access a texture map.

A first entry of the coalesce buffer 440 includes an address 460-0 and data sectors 473-0, 472-0, 471-0, and 470-0. A second entry of the coalesce buffer 440 includes an address 460-1 and data sectors 473-1, 472-1, 471-1, and 470-1. The addresses 460 may be a real address (e.g., virtual, physical, or a relative address with an offset added after coalescing). Alternately, the addresses 460 may each be an n-tuple including coordinates, mip level, array index, and/or a texture identifier. Each one of the 8 source channels may be provided to the four separate data sectors within the first or second entry. In one embodiment, the capacity of each data sector is 32 bytes. The byte enables for the different sectors and coalesce buffer entries are also maintained by the coalesce control unit 400. The address 460 in each entry is provided by the request FIFO 425 and the corresponding data is routed by the data crossbar 435 to one or more data sectors of the first or second coalesce buffer entry. When all of the data stored in a FIFO entry at the head of the data bypass FIFO 410 has been inserted into data sectors, the FIFO entry is popped (i.e., the data is removed from the data bypass FIFO 410) and the corresponding FIFO entry of the request FIFO 425 is also popped.

In one embodiment, the address is output to a virtual address generation unit 445 to convert coordinates and/or relative addresses into virtual addresses (or physical memory addresses). The virtual address is then stored into the address 460. The virtual address generation unit 445 may be configured to generate the virtual address for a coalesce buffer entry in parallel with the filling of the coalesce buffer entry. The virtual address is output to the memory operation output unit 450 by the virtual address generation unit 445 in parallel with the data stored in a coalesce buffer entry and byte enables.

Referring back to the Memory access coalescing unit 460 shown in FIG. 4A, coalescing may be determined either by coordinates in the case of texture read requests and surface (e.g., frame buffer) load and store requests, or by addresses for load and store requests accessing global or local memory. The coalesce control unit 400 may be configured to clear coalesce buffer coverage information (e.g., byte enables) when an entry is flushed from the coalesce buffer 440. In one embodiment, one or more data sectors may be flushed without flushing the entire entry. When only a portion of a coalesce buffer entry is flushed, only the corresponding coalesce buffer coverage information should be cleared.

The coalesce control unit 400 may also be configured to merge bytes of data generated by different threads that, based on the store request address for each store request, are directed to different bytes of the same memory destination word. The coalesce control unit 400 may also be configured to collapse bytes of data generated by different threads that, based on the store request address for each request, are directed to the same bytes of the same memory destination word, so that the bytes of data generated by one of the two threads are inserted into the coalesce buffer 440 and the conflicting bytes of data are discarded. The coalesce control unit 400 may also be configured to replace bytes of data generated by different threads that, based on the store request address for each request, are directed to the same bytes of the same memory destination word so that data generated by a first thread is overwritten in the coalesce buffer 440 by data generated by a second thread, as allowed by the instruction set architecture for the SM 250. For example, when no intervening load request is present between two store requests for the same memory destination word, a subsequent store request may overwrite an earlier store request.

The coalesce control unit 400 may be configured to ensure serialization of reduction operands for store operations to the same memory destination word by not allowing store collapsing or replacing for reduction operands. For example, once an operand is stored in a coalesce buffer entry, subsequent data may be merged, but may not be collapsed with or replace the operand. Atomic operands may be handled in the same manner as reduction operands.

In one embodiment, load prefetch requests, reduction store requests, and atomic store requests may also be coalesced in addition to load and store requests. Furthermore, coalescing of memory access requests may be enabled or disabled for different address spaces in the memory system. For example, coalescing of load requests may be enabled for global/local memory spaces and surfaces while coalescing may be disabled for portions of memory allocated to store texture maps. Coalescing of memory access requests may also be separately enabled or disabled for store requests and load requests. Coalescing of texture read requests may be separately enabled or disabled from other load requests.

The coalesce control unit 400 is configured to flush a coalesce buffer entry based on various criteria. For example, a coalesce buffer entry may be flushed when the capacity for the coalesce buffer entry is reached (i.e., the coalesce buffer entry is full according to the byte enables). In one embodiment, each data sector of a coalesce buffer may be flushed when the data sector is full without flushing the entire coalesce buffer entry. When one or more data sectors are flushed, a memory operation is generated by the memory access coalescing unit 460 with the address from the coalesce buffer entry and byte enables corresponding to the one or more data sectors. When the memory operation is a store, the data stored in the one or more data sectors is also output to generate the memory operation. The byte enables for the one or more data sectors are cleared, but the address 460 is not cleared. When all of the byte enables are cleared, the address 460 is also cleared.

In one embodiment, a full coalesce buffer entry (or data sector) is not flushed until an empty coalesce buffer entry is needed to coalesce a new memory access request. The particular coalesce buffer entry that is flushed when both entries are full may be selected based on a least-recently used, least-recently accessed, not-most-recently used rule, or any other scheme. A coalesce buffer entry may be flushed when the end-of-warp (or end of a thread block) is reached.

The coalesce control unit 400 may be configured to flush a coalesce buffer entry when a new memory access request conflicts with the access requests that have already been inserted into the coalesce buffer entry. For example, an access conflict may exist when the address of a new load request matches the address of a store request that is already inserted into the coalesce buffer entry. In another embodiment, the data that has been inserted into the coalesce buffer entry for the store request may be returned to execute the new load request, in which case the new load request should not be coalesced into the coalesce buffer entry.

A coalesce buffer entry may also be flushed when a memory access request is associated with new texture state, such as when a texture identifier changes between memory access requests. In one embodiment, only the data sectors that match the texture identifier of the new texture state are flushed, so that the new texture state is not inadvertently used to process the memory access requests received before the texture state change. A coalesce buffer entry may also be flushed when a serialization conflict exists between a new memory access request and a memory access request that was already inserted in the coalesce buffer entry.

Finally, a coalesce buffer entry (or data sector) may be flushed in response to a timeout condition when a predetermined amount of time has passed without receiving a new memory access request.

Figure 5:
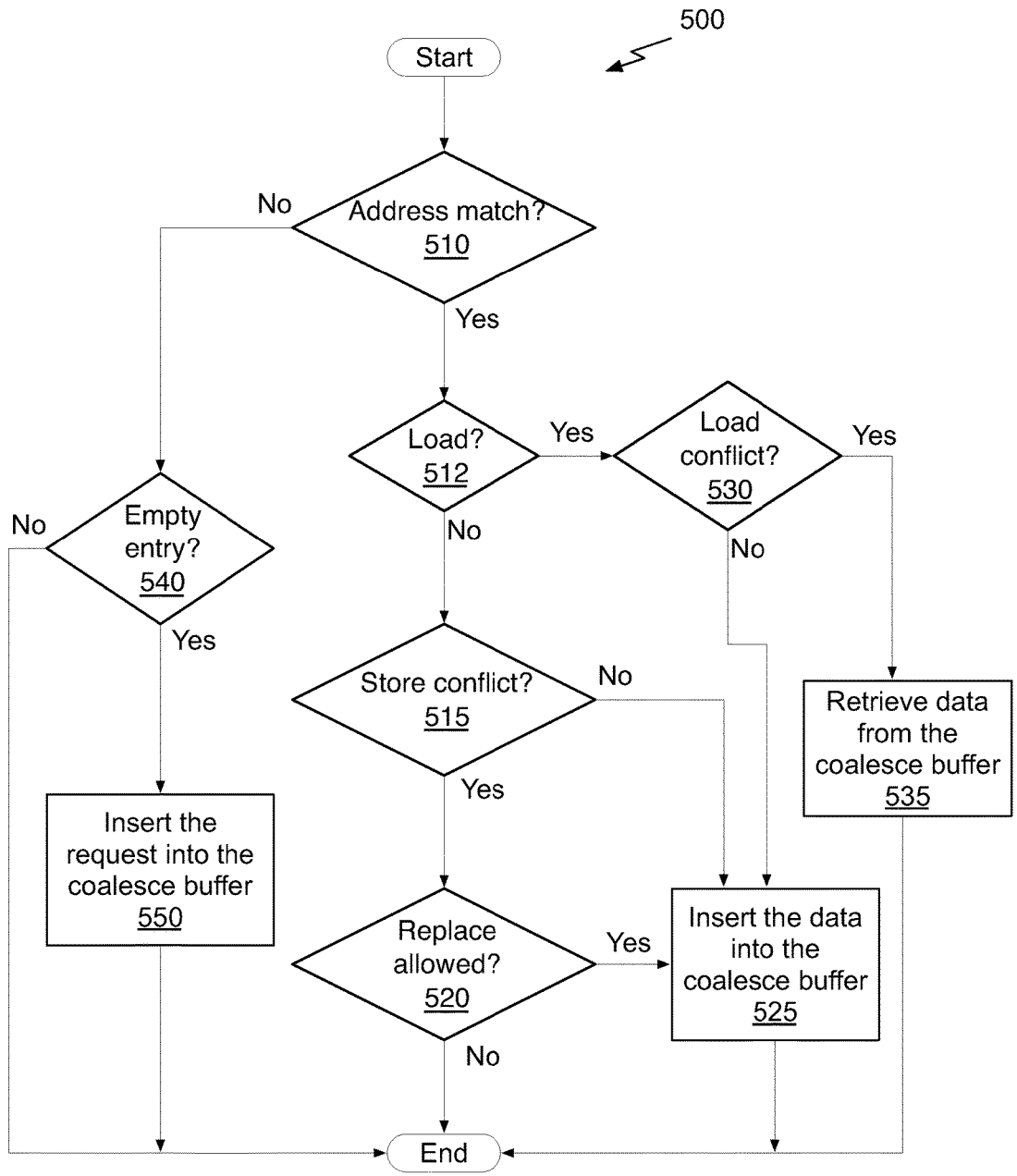
FIG. 5 illustrates a flowchart of a method for coalescing memory accesses into a coalesce buffer, in accordance with one embodiment.

FIG. 5 illustrates a flowchart of a method 500 for coalescing memory accesses into the coalesce buffer 440, in accordance with one embodiment. At operation 510, the coalesce control unit 400, determines if an address at the head of the request FIFO 425 matches an address of one of the entries in the coalesce buffer 440, and, if so, then at operation 512 the coalesce control unit 400 determines if the memory access request associated with the address is a load (or texture read) request. At operation 530, the coalesce control unit 400, determines if the requested data corresponding to the load request conflicts with data already inserted into the coalesce buffer 440, and, if so, at operation 535, the data that is already inserted into the coalesce buffer 440 for a store request is retrieved from the coalesce buffer to execute the load request. A load conflict may be identified based on the address and byte enables. If, at operation 530, there is not a load conflict, then at operation 525, the load request is inserted into the coalesce buffer 440, either merging the load request with a previous load request or inserting the load request as a new request into the coalesce buffer 440. When a load request is inserted into the coalesce buffer 440, the corresponding byte enables are updated to track whether the coalesce buffer is full. In one embodiment, for the purposes of performing a load memory operation, if any byte is needed for a particular sector, the entire sector is read from the memory system.

If, at operation 512, the coalesce control unit 400, determines that the memory access is a store request, then at operation 515, the coalesce control unit 400, determines if a store conflict exists based on the byte enables for the store request. If a store conflict does not exist, then at operation 525 the coalesce control unit 400 configures the data crossbar 435 to route the data to a coalesce buffer entry, thereby transforming the store request from thread execution order to memory order. At operation 525, the data corresponding to the store request is merged into the coalesce buffer entry having a matching address.

If, at operation 515, a store conflict does exist, then the conflicting store request may be collapsed or may replace a store request that has already been inserted into the coalesce buffer 440. At operation 520, the coalesce control unit 400 determines if replacement is allowed according to the instruction set architecture for the SM 250, and, if so, then at operation 525 the data corresponding to the store conflict is inserted into the coalesce buffer entry having a matching address. Otherwise, the store request is not inserted into the coalesce buffer 440 until after the conflicting request is flushed to the memory system.

If, at operation 510, the coalesce control unit 400, determines that an address at the head of the request FIFO 425 does not match an address of one of the entries in the coalesce buffer 440, then at operation 540 the coalesce control unit 400 determines if a coalesce buffer entry is empty. If an entry in the coalesce buffer 440 is empty, then at operation 550, the address of the request is inserted into the empty entry. The coalesce control unit 400 configures the data crossbar 435 to transform the data and/or byte enables from thread execution order to memory order before the data and/or byte enables are inserted into the coalesce buffer 440. When the request is a store request, the corresponding data is also inserted into the entry. Byte enables associated with the entry are also inserted into the entry. If, at operation 540, the coalesce control unit 400 determines that an empty entry is not available, then the memory access request is not processed until one of the entries becomes available (i.e., until an entry is flushed to memory).

Figure 6:
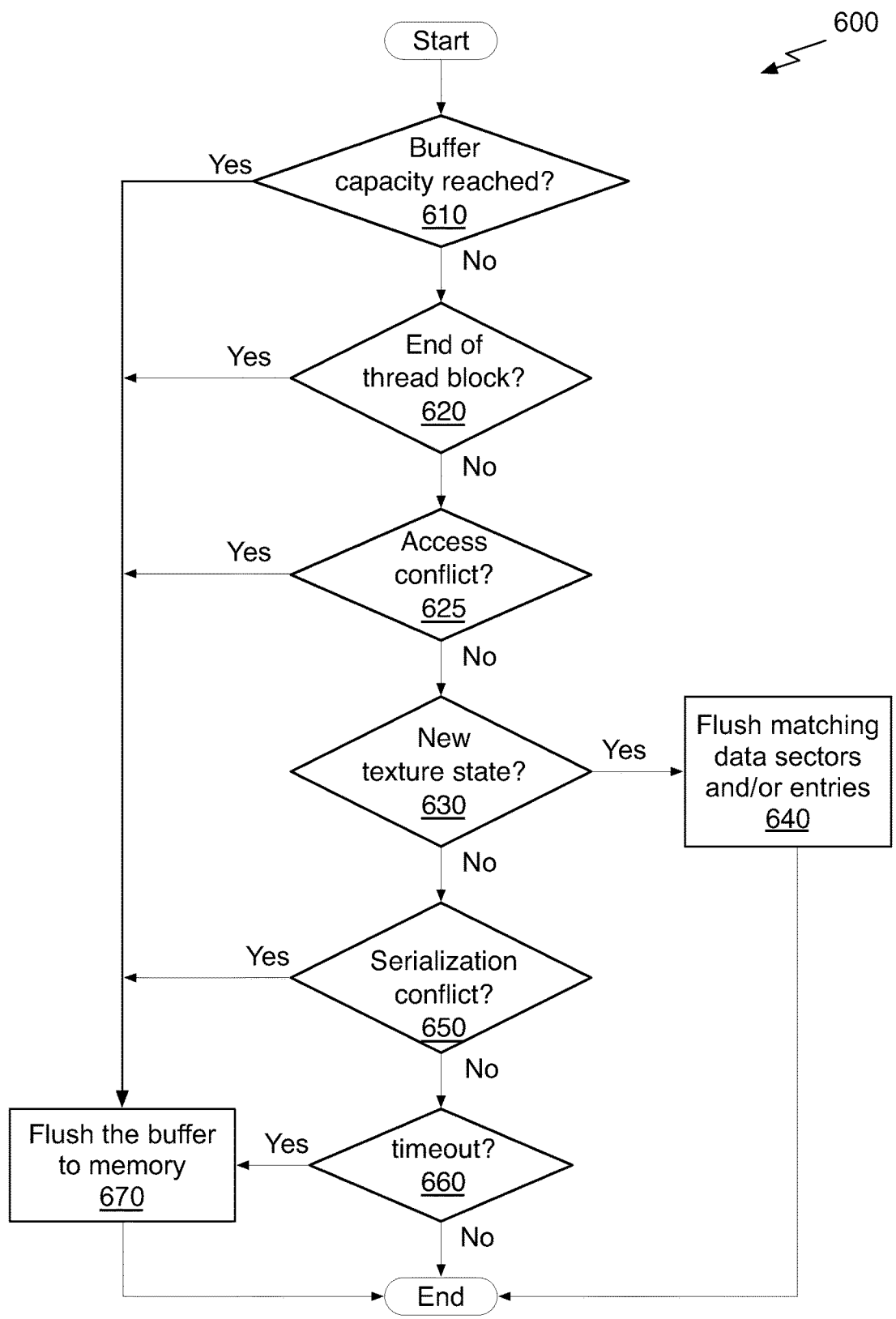
FIG. 6 illustrates a flowchart of a method for flushing the coalesce buffer to a memory system, in accordance with one embodiment.

FIG. 6 illustrates a flowchart of a method 600 for flushing the coalesce buffer 440 to a memory system, in accordance with one embodiment. At operation 610, the coalesce control unit 400 determines if the buffer capacity has been reached for one or more of the entries in the coalesce buffer 400, and, if so, at operation 670 the one or more entries are flushed to the memory system. The buffer capacity for an entry is reached when all of the byte enables for the entry are set indicating that load or store requests have been coalesced for each of the data sectors included in the entry.

If, at operation 610, the capacity of the coalesce buffer 440 has not been reached, then at operation 620, the coalesce control unit 400 determines if the end of a thread block or warp has been reached, and, if so, at operation 670 the entries of the coalesce buffer 400 corresponding to the thread block are flushed to the memory system. In one embodiment, all entries of the coalesce buffer 400 are flushed when the end of a thread block or warp is reached. If, at operation 620, the coalesce control unit 400 determines that the end of a thread block or warp has not been reached, then at operation 625 the coalesce control unit 400 determines if an access conflict exists. An access conflict exists when the address of store request to be coalesced matches an address in one of the entries of the coalesce buffer 400 and the byte enables of the access request conflicts with the byte enables associated with the coalesce buffer entry.

If an access conflict does exist, then at operation 670 the matching entry is flushed to the memory system. Otherwise, at operation 630, the coalesce control unit 400 determines if new texture state has been received after an access request has been coalesced into the coalesce buffer 400. If new texture state has been received, then at operation 640, data sectors associated with set byte enables and having a texture identifier that matches the new texture state are flushed to the memory system and the byte enables are then cleared. In one embodiment, any coalesce buffer entry into which an access request has been inserted is flushed to the memory system when the texture state changes.

If, at operation 630, new texture state is not received, then, at operation 650, the coalesce control unit 400 determines if a serialization conflict exists for a memory access that encodes an atomic operand or a reduction operation. If a serialization conflict does exist, then at operation 670 the conflicting entry is flushed to the memory system. Otherwise, at operation 660, the coalesce control unit 400 determines if a timeout condition exists, and, if so, at operation 670 the entry associated with the timeout condition is flushed to the memory system. Otherwise, the coalesce entries are not flushed.

Figure 7:
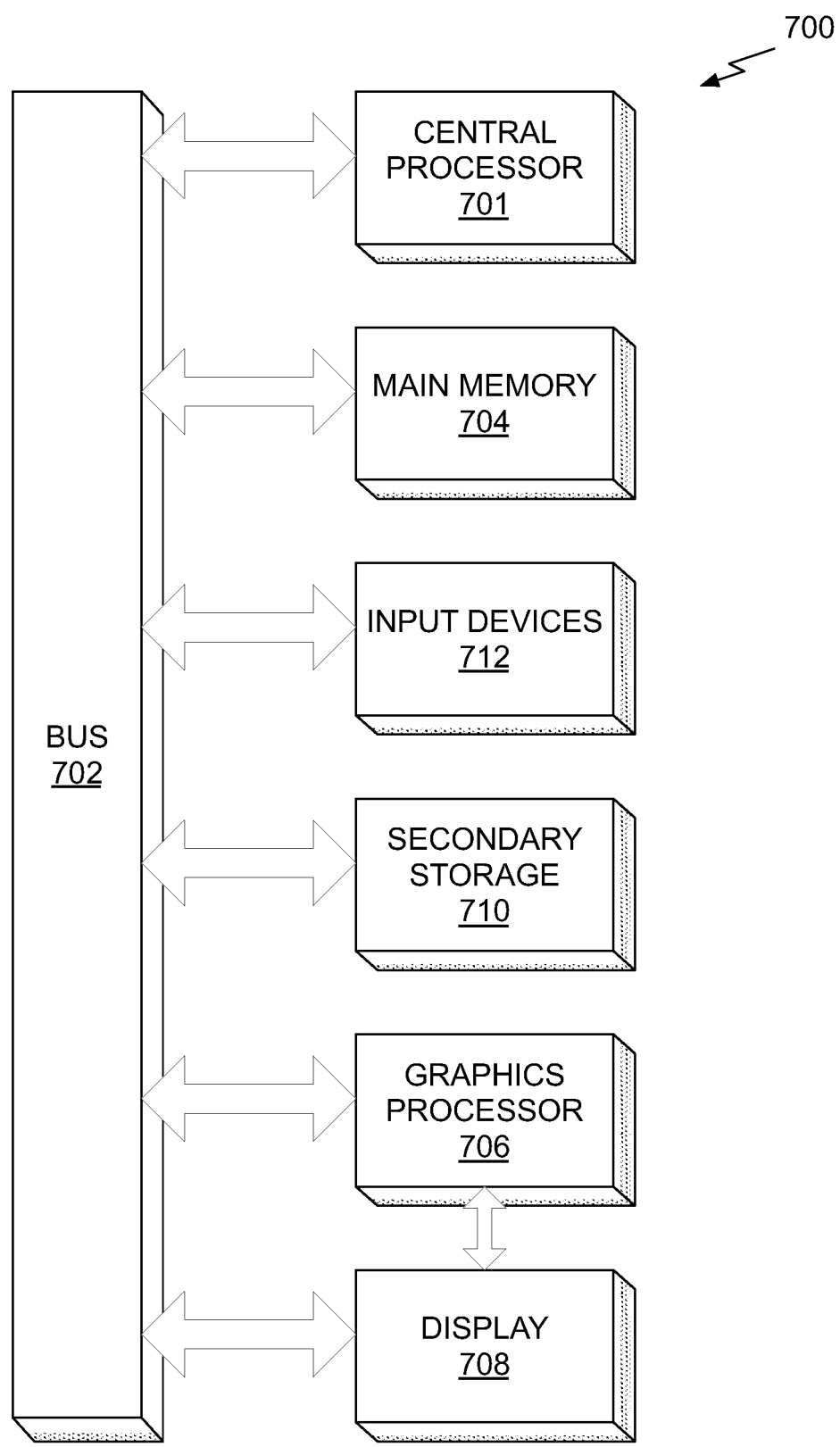
FIG. 7 illustrates an exemplary system in which the various architecture and/or functionality of the various previous embodiments may be implemented.

FIG. 7 illustrates an exemplary system 700 in which the various architecture and/or functionality of the various previous embodiments may be implemented. As shown, a system 700 is provided including at least one central processor 701 that is connected to a communication bus 702. The communication bus 702 may be implemented using any suitable protocol, such as PCI (Peripheral Component Interconnect), PCI-Express, AGP (Accelerated Graphics Port), HyperTransport, or any other bus or point-to-point communication protocol(s). The system 700 also includes a main memory 704. Control logic (software) and data are stored in the main memory 704 which may take the form of random access memory (RAM).

The system 700 also includes input devices 712, a graphics processor 706, and a display 708, i.e. a conventional CRT (cathode ray tube), LCD (liquid crystal display), LED (light emitting diode), plasma display or the like. User input may be received from the input devices 712, e.g., keyboard, mouse, touchpad, microphone, and the like. In one embodiment, the graphics processor 706 may include a plurality of shader modules, a rasterization module, etc. Each of the foregoing modules may even be situated on a single semiconductor platform to form a graphics processing unit (GPU).

In the present description, a single semiconductor platform may refer to a sole unitary semiconductor-based integrated circuit or chip. It should be noted that the term single semiconductor platform may also refer to multi-chip modules with increased connectivity which simulate on-chip operation, and make substantial improvements over utilizing a conventional central processing unit (CPU) and bus implementation. Of course, the various modules may also be situated separately or in various combinations of semiconductor platforms per the desires of the user.

The system 700 may also include a secondary storage 710. The secondary storage 710 includes, for example, a hard disk drive and/or a removable storage drive, representing a floppy disk drive, a magnetic tape drive, a compact disk drive, digital versatile disk (DVD) drive, recording device, universal serial bus (USB) flash memory. The removable storage drive reads from and/or writes to a removable storage unit in a well-known manner.

Computer programs, or computer control logic algorithms, may be stored in the main memory 704 and/or the secondary storage 710. Such computer programs, when executed, enable the system 700 to perform various functions. For example, a compiler program that is configured to examiner a shader program and enable or disable attribute buffer combining may be stored in the main memory 704. The compiler program may be executed by the central processor 701 or the graphics processor 706. The main memory 704, the storage 710, and/or any other storage are possible examples of computer-readable media.

In one embodiment, the architecture and/or functionality of the various previous figures may be implemented in the context of the central processor 701, the graphics processor 706, an integrated circuit (not shown) that is capable of at least a portion of the capabilities of both the central processor 701 and the graphics processor 706, a chipset (i.e., a group of integrated circuits designed to work and sold as a unit for performing related functions, etc.), and/or any other integrated circuit for that matter.

Still yet, the architecture and/or functionality of the various previous figures may be implemented in the context of a general computer system, a circuit board system, a game console system dedicated for entertainment purposes, an application-specific system, and/or any other desired system. For example, the system 700 may take the form of a desktop computer, laptop computer, server, workstation, game consoles, embedded system, and/or any other type of logic. Still yet, the system 700 may take the form of various other devices including, but not limited to a personal digital assistant (PDA) device, a mobile phone device, a television, etc.

Further, while not shown, the system 700 may be coupled to a network (e.g., a telecommunications network, local area network (LAN), wireless network, wide area network (WAN) such as the Internet, peer-to-peer network, cable network, or the like) for communication purposes.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method, comprising:
   receiving a plurality of memory access requests in a thread execution order, wherein a first portion of the memory access requests are associated with a first thread block including first threads that are executed in parallel and a second portion of the memory access requests includes second threads that are executed in parallel;
   determining that a buffer capacity of a coalesce buffer has not been reached for one or more entries in the coalesce buffer before coalescing the first portion of the memory access requests into the coalesce buffer, wherein coalescing of memory access requests is disabled for texture read requests and enabled for load memory requests accessing other dimensioned memory allocations;
   determining an end of the first thread block is reached; and
   in response to determining that the end of the first thread block is reached,
   generating a memory operation that is transmitted to a memory system, the memory operation representing the coalesced first portion of memory access requests.

2. The method of claim 1, wherein the plurality of memory access requests includes at least one texture read request and at least one store request to a dimensioned memory allocation.

3. The method of claim 1, further comprising:
   receiving a first memory access request that is not included in the plurality of memory access requests;
   determining the first memory access request is an atomic store memory request specifying a first address that is also specified by a memory access request included in the second portion; and
   generating a second memory operation that is transmitted to the memory system, the second memory operation representing the second portion of memory access requests.

4. The method of claim 1, further comprising:
   receiving a first memory access request that is not included in the plurality of memory access requests;
   determining the first memory access request is a reduction store memory request specifying a first address that is also specified by a memory access request included in the second portion; and
   generating a second memory operation that is transmitted to the memory system, the second memory operation representing the second portion of memory access requests.

5. The method of claim 1, further comprising:
   receiving a memory access store request that is not included in the plurality of memory access requests;
   determining memory access requests included in the second portion are load requests; and
   generating a second memory operation that is transmitted to the memory system, the second memory operation representing the second portion of memory access requests.

6. The method of claim 1, wherein the coalescing comprises:
   determining that a first address specified by a first memory access request in the first portion of memory access requests matches a second address specified by a second memory access request in the first portion of memory access requests;
   determining first byte enables specified by the first memory access request do not match second byte enables specified by the second memory access request; and
   merging the first memory access request and the second memory access request.

7. The method of claim 1, wherein the coalescing comprises:
   determining a first address specified by a first memory access request in the first portion of memory access requests matches a second address specified by a second memory access request in the first portion of memory access requests;

determining first byte enables specified by the first memory access request match second byte enables specified by the second memory access request; and discarding either the first memory access request or the second memory access request.

8. The method of claim 1, wherein the coalescing comprises:

inserting a first memory access request in the first portion of memory access requests into a coalesce buffer entry;

determining a first address specified by the first memory access request matches a second address specified by a second memory access request in the first portion of memory access requests;

determining that first byte enables specified by the first memory access request match second byte enables specified by the second memory access request; and replacing the first memory access request with the second memory access request in the coalesce buffer entry.

9. The method of claim 1, wherein the memory operation has a capacity equal to a cache line.

10. The method of claim 1, wherein coalescing of memory access requests is enabled for a first memory address space of a memory system accessed by the first portion of the memory access requests and is disabled for a second memory address space of the memory system accessed by the second portion of the memory access requests.

11. The method of claim 1, wherein data for the first portion of memory access requests is transformed from thread execution order to memory order before the data is inserted into the coalesce buffer.

12. The method of claim 1, wherein the second portion of the memory access requests are associated with a second thread block, and further comprising:

determining that the buffer capacity of the coalesce buffer has been reached for a first entry in the coalesce buffer when all byte enables for the first entry are set;

flushing the first entry to a memory system before coalescing the second portion of the memory access requests;

determining an end of the second thread block is reached; and in response to determining that an end of the second thread block is reached, generating a second memory operation that is transmitted to the memory system, the second memory operation representing the coalesced second portion of memory access requests.

13. The method of claim 1, wherein the first portion of memory access requests are specified by texture coordinates and the second portion of memory access requests are specified by virtual addresses.

14. The method of claim 1, further comprising:

determining that a predetermined amount of time has passed without receiving a new memory access request; and generating, in response to determining that the predetermined amount of time has passed, a second memory operation that is transmitted to a memory system, the second memory operation representing the second portion of memory access requests.

15. A method, comprising:

receiving a plurality of memory access requests in a thread execution order, wherein a first portion of the memory access requests are associated with a first thread block including first threads that are executed in parallel and a second portion of the memory access requests includes second threads that are executed in parallel;

determining that a buffer capacity of a coalesce buffer has not been reached for one or more entries in the coalesce buffer before coalescing the first portion of the memory access requests into the coalesce buffer;

maintaining byte enables indicating which bytes of a coalesce buffer entry are enabled for the first portion of the memory access requests;

determining an end of the first thread block is reached; and in response to determining that the end of the first thread block is reached, generating a memory operation that is transmitted to a memory system, the memory operation representing the coalesced first portion of memory access requests.

16. A processing unit comprising:

a memory access request buffer that is configured to store a plurality of memory access requests in a thread execution order, wherein a first portion of the memory access requests are associated with a first thread block including first threads that are executed in parallel and a second portion of the memory access requests includes second threads that are executed in parallel; and a coalesce buffer that is coupled to the memory access request buffer and configured to:

determine that a buffer capacity of the coalesce buffer has not been reached for one or more entries in the coalesce buffer before coalescing the first portion of the memory access requests into the coalesce buffer, wherein coalescing of memory access requests is disabled for texture read requests and enabled for load memory requests accessing other dimensioned memory allocations;

determine an end of the first thread block is reached; and in response to determining the end of the first thread block is reached, generate a memory operation that is transmitted to a memory system, the memory operation representing the coalesced first portion of memory access requests.

17. A system comprising:

a memory system; and one or more processing cores coupled to the memory system and that are each configured to:

receive a plurality of memory access requests in a thread execution order, wherein a first portion of the memory access requests are associated with a first thread block including first threads that are executed in parallel and a second portion of the memory access requests includes second threads that are executed in parallel;

determine that a buffer capacity of a coalesce buffer has not been reached for one or more entries in the coalesce buffer before coalescing the first portion of the memory access requests into the coalesce buffer, wherein coalescing of memory access requests is disabled for texture read requests and enabled for load memory requests accessing other dimensioned memory allocations;

determine an end of the first thread block is reached; and in response to determining the end of the first thread block is reached, generate a memory operation that is transmitted to the memory system, the memory operation representing the coalesced first portion of memory access requests.

* * * * *